No. 848,112. PATENTED MAR. 26, 1907.
J. G. MATTHEWS.
PROCESS OF MANUFACTURING BORING OR MILLING CUTTERS.
APPLICATION FILED JUNE 22, 1904.
2 SHEETS—SHEET 1.
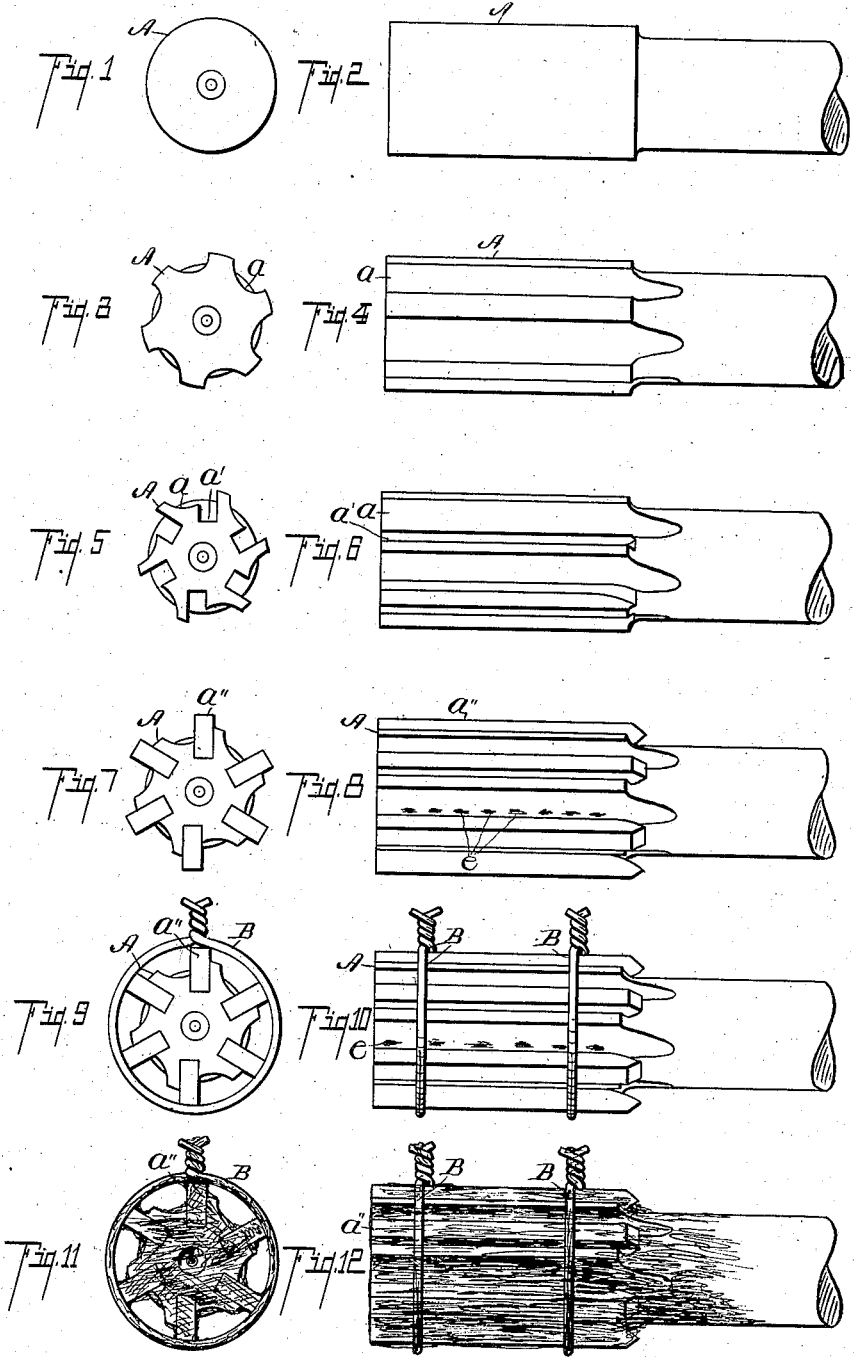

No. 848,112. PATENTED MAR. 26, 1907.
J. G. MATTHEWS.
PROCESS OF MANUFACTURING BORING OR MILLING CUTTERS.
APPLICATION FILED JUNE 22, 1904.
2 SHEETS—SHEET 2.
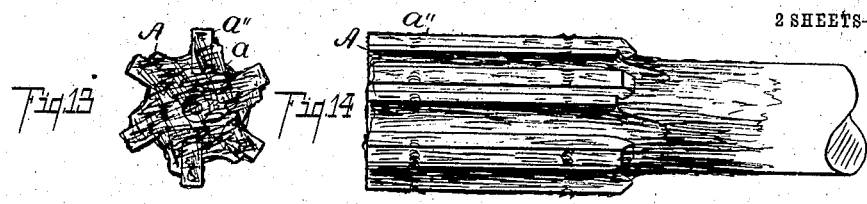
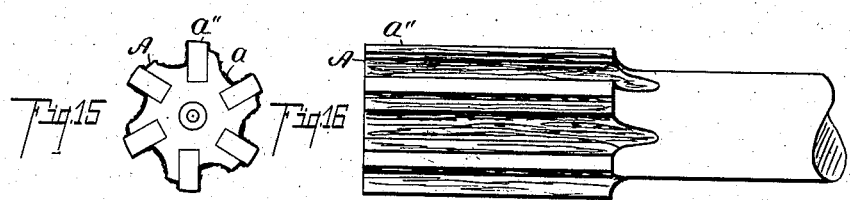
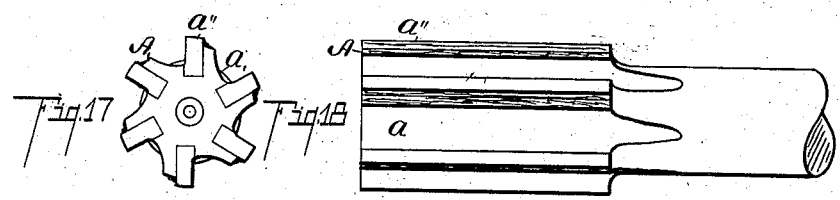
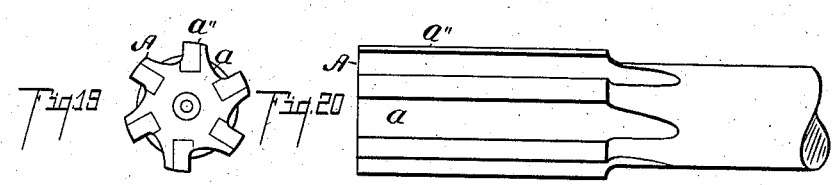
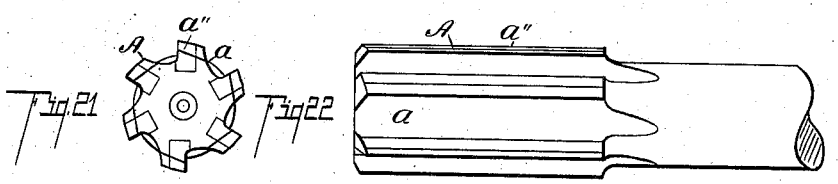
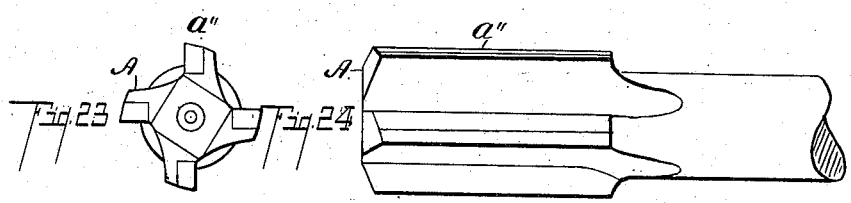
Witnesses:
Inventor,
John G. Matthews
By Fred L. Chappell
Atty

UNITED STATES PATENT OFFICE.

JOHN G. MATTHEWS, OF THREE RIVERS, MICHIGAN.

PROCESS OF MANUFACTURING BORING OR MILLING CUTTERS.

No. 848,112.  Specification of Letters Patent.  Patented March 26, 1907.

Application filed June 22, 1904. Serial No. 213,718.

*To all whom it may concern:*

Be it known that I, JOHN G. MATTHEWS, a citizen of the United States, residing at the city of Three Rivers, in the county of St. Joseph and State of Michigan, have invented certain new and useful Improvements in Processes of Manufacturing Boring or Milling Cutters, of which the following is a specification.

This invention relates to an improved process of manufacturing boring or milling cutters.

The main object of this invention is to provide an improved process of manufacturing boring or milling cutters.

Further objects will definitely appear from the detailed description to follow.

I accomplish the objects of my invention by the devices and means described in the following specification.

The invention is clearly defined and pointed out in the claims.

A structure embodying the features of my invention and showing the steps of the process or method of manufacture is clearly illustrated in the accompanying drawing, forming a part of this specification, in which—

Figures 1 and 2 show an end and side view of the steel shank or body of a reamer in the first step of my process of manufacture. Figs. 3 and 4 show an end and side view of the same in the second step of the process of manufacture, in which flutes are cut into the head. Figs. 5 and 6 show an end and side view of the shank in the next step of the process of manufacture, in which the seats are cut for the cutting-blades of the high-grade steel. Figs. 7 and 8 are end and side elevation views of the next step of the manufacture in which the said blades are inserted in their seats, fitted closely, and showing the means of retaining the same close within their seats. Figs. 9 and 10 are views showing the next step of the process, in which the blades are bound securely in position with wrapping-wires, as B B, around the same. Figs. 11 and 12 show the next step of the process, being end and side elevation views after the brazing and hardening have been accomplished. Figs. 13 and 14 show end and side elevation views of the structure after the wrapping-wires have been removed and the flux cleaned off. Figs. 15 and 16 show end and side elevations of the structure with the end projections of the blades ground away and the spelter ground off the peripheries of the blades. Figs. 17 and 18 show end and side elevation views of the reamer, in which the flutes are ground out and the front sides of the blades are formed and the shank or body is in its finished condition. Figs. 19 and 20 show the reamer with the peripheries of the blades ground to a true circle and to the proper size for the reamer. Figs. 21 and 22 show the points of the blades cut away for clearance and the backs of the blades relieved and the tool in its finished condition. Figs. 23 and 24 show another form of a finished four-blade reamer or boring-tool in which the stock of the body is entirely cut away from the front of the cutting-blades.

In the drawing similar letters of reference refer to similar parts throughout the several views.

In describing my invention I will first point out and indicate the different steps of the process of manufacture and then describe the completed tool in the form preferred and in the modified form in which it appears in the drawings.

To properly produce my improved reaming or milling tool, I first turn a simple plain shank, as A, to substantially the size required, as appears in Figs. 1 and 2 of the drawings.

The next step of the process I prefer to cut flutes *a* in this head or shank; but this step of the process might be omitted or come later. I am giving the process as preferred by me as I proceed and will indicate any variations. This cutting of the flutes insures proper exposure of the blades for hardening.

The third step consists in forming longitudinal seats *a'* in this head or shank to receive the blades of high-speed steel and is illustrated in Figs. 5 and 6.

Figs. 7 and 8 show the step of the process which consists in placing the blades *a''*, of high-speed steel, in position and securing them there by indenting the metal forming the adjacent front wall in a series of light indentations by means of a punch and forcing the blades into the bottom of the slots after such indentations have been formed by placing in a vise or other means. These indentations have the effect of forcing the metal into very close contact with the blade, retaining the blade in position by the frictional contact of the metal of the shank with the said blade.

Figs. 9 and 10 show the step of the process which consists in placing retaining-wires around the tool to retain the blades securely within the seat during the brazing and hardening operation, a pair of wires B being illustrated, although sometimes a single wire is sufficient, and oftentimes several are employed.

Figs. 11 and 12 show the sixth step of the process. After the tool has been heated to the proper point for hardening the steel and the whole has been treated with a proper flux and solder or spelter it is cooled by a proper method to secure the hardening of the steel and the setting of the spelter or solder to form a bond between the blades and the head. By pursuing this method it will be noted that when the tool is heated with the retaining-wires around it the wires will become expanded, so that they do not serve to retain the blades very securely during the heating and brazing process; but when the tool is cooled, either by air-blast or by immersing in oil or otherwise appropriate to the steel to be hardened, the retaining-wires B will be cooled first and will consequently sharply contract and force the blades to the bottom of their seats before the spelter sets, thus retaining the blades in the best possible manner for their successful use thereafter, and this is accomplished no matter how the cooling is done. It is preferred to cool both ends of the blade first, as by that means they will be retained properly in position until the spelter is entirely set and the blade is thus prevented from warping. While these retaining-wires will be observed to serve a very valuable function, it is desired to remark that in many tools the retaining-wires will not be required at all and that the same may be dispensed with, and this is particularly true where care is taken to cool the ends of the blades first and allow the spelter to set at the ends to prevent the warping of the blades, as I have heretofore indicated. Where the blades are very short, however, no precaution need be taken to prevent warping at all. After the hardening and brazing the binding-wires are removed and the flux cleaned off, leaving the reamer as seen in Figs. 13 and 14. The projecting ends of the blades are then ground and the spelter is ground away to clean the metal for the entire length of the peripheries of the blades, the object of this being to present a clean surface for inspection during the next step of the process and to properly test the temper of the blades, leaving the reamer as seen in Figs. 15 and 16. The flutes are next cleaned out. The front sides of the blades are ground and finished and the shank of the reamer is ground true to size and finished back of the blades, as seen in Figs. 17 and 18. The reamer is then ground to size, so that the peripheries of the blades receive a true finish. (See Figs. 19 and 20.) The points of the blades are then formed by cutting proper clearance thereon. The peripheries of the blades are beveled at the back for relief. This makes the tool free-cutting and completely finishes the same.

I have already indicated some changes in the steps of the process and that some of the steps might be omitted. I will state that the shank of the tool back of the cutting-blade might be finished at any time after the brazing and hardening, whichever happened to be most convenient; also, that the step in which the front of the blades are finished might result in cutting away the stock of the body to the bottom of the blade, particularly where a smaller number of blades than six is made use of, as clearly appears in Figs. 23 and 24, or on reamers of large diameter, and the other steps subsequent would result in a finished tool like that appearing in Figs. 23 and 24 of the drawing, the preceding steps being the same from that point on. This enables a rapid-cutting reamer to be formed for cast-iron and provides a sufficient clearance for the removal of a large amount of metal from the enlargement of a hole and permits a very quick cut for softer metals.

Regarding the fourth step referred to, while it is very desirable to retain the metal by slight indentations—and I desire to claim that specifically—I believe that some equivalent means might be employed at this point that might upset and force the metal into frictional contact without the necessity of the punch-marks. It would be necessary, however, to employ some such means as this in order to afford the necessary space for the entry of the spelter or solder to form the bond, a very slight space only being required, estimated at the one-thousandth part of an inch, or even less. Experience has demonstrated that with care this indentation can be continuous, although the indentation at intervals is desirable.

Having thus described my improved reamer or milling-tool and the process of manufacturing the same, I desire to state, as already indicated, that it could be considerably varied in its details without departing from my invention.

Having thus described my improved reamer or milling-tool and the method of manufacturing the same, what I claim as new, and desire to secure by Letters Patent, is—

1. The process of manufacturing a reamer or milling-tool, consisting of, first, forming the body and cutting seats therein; second, placing cutting-blades of high-speed or air-hardening steel in said seats and upsetting the metal against the inserted blades; third, arranging binding-wires about the blades;

fourth, heating the tool with the binding-wires, to a proper temperature for hardening the blades and applying a suitable spelter to the tool to form a bond between the blades and the said body; fifth, cooling the said tool by a proper method, beginning at both ends of the blades, by an air-blast or by immersion in oil, or equivalent means, to contract the binding-wires and set the spelter and properly harden the blades, as specified.

2. The process of manufacturing a reamer or milling-tool, consisting of first, forming the body and cutting seats therein; second, placing cutting-blades of high-speed or air-hardening steel in the said seats and upsetting the metal against the inserted blades; third, heating the tool to a proper temperature for hardening the blades and applying a suitable spelter to the tool to form a bond between the blades and the said body; fourth, cooling the said tool by a proper method, beginning at both ends of the blades, by an air-blast or by immersion in oil, or equivalent means, to set the spelter and properly harden the blades, as specified.

3. The process of manufacturing a reamer or milling-tool, consisting of first, forming the body and cutting seats therein; second, placing cutting-blades of high-speed or air-hardening steel in said seats and upsetting the metal against the inserted blades; third, arranging binding-wires about the blades; fourth, heating the tool with the binding-wires, to a proper temperature for hardening the blades and applying a suitable spelter to the tool to form a bond between the blades and the said body; fifth, cooling the said tool by a proper method, by an air-blast or by immersion in oil or other equivalent means to contract the binding-wires and set the spelter and properly harden the blades, as specified.

4. The process of manufacturing a reamer or milling-tool, consisting of first, forming the body and cutting seats therein; second, placing cutting-blades of high-speed or air-hardening steel in said seats and upsetting the metal against the inserted blades; third, heating the tool to a proper temperature for hardening the blades and applying a suitable spelter to the tool to form a bond between the blades and the said body; fourth, cooling the said tool by a proper method, by an air-blast or by immersion in oil or equivalent means, to set the spelter and properly harden the blades, as specified.

5. The process of manufacturing a reamer or milling-tool, consisting of first, forming the body and cutting seats therein; second, placing cutting-blades of high-speed or air-hardening steel in said seats; third, arranging binding-wires about the blades; fourth, heating the tool, with the binding-wires, to a proper temperature for hardening the blades and applying a suitable spelter to the tool to form a bond between the blades and the said body; fifth, cooling the said tool by a proper method, beginning at both ends of the blades, by an air-blast or by immersion in oil, or equivalent means, to contract the binding-wires and set the spelter and properly harden the blades, as specified.

6. The process of manufacturing a reamer or milling-tool, consisting of first, forming the body and cutting seats therein; second, placing cutting-blades of high-speed or air-hardening steel in said seats; third, arranging binding-wires about the blades; fourth, heating the tool with the binding-wires, to a proper temperature for hardening the blades, and applying a suitable spelter to the tool to form a bond between the blades and the said body; fifth, cooling the said tool by a proper method, by an air-blast, or by immersion in oil, or equivalent means, to contract the binding-wires and set the spelter and properly harden the blades, as specified.

In witness whereof I have hereunto set my hand and seal in the presence of two witnesses.

JOHN G. MATTHEWS. [L. S.]

Witnesses:
FRED L. CHAPPELL,
OTIS A. EARL.